United States Patent [19]
Umpleby et al.
[11] 4,142,137
[45] Feb. 27, 1979

[54] OPERATOR MOTOR CONTROL

[75] Inventors: Kenneth F. Umpleby, Ann Arbor; Maurice R. Brackney, Warren, both of Mich.

[73] Assignee: Multi-Elmac Company, Novi, Mich.

[21] Appl. No.: 863,080

[22] Filed: Dec. 22, 1977

[51] Int. Cl.[2] .......... H02P 1/42

[52] U.S. Cl. .......... 318/283; 318/16; 318/256; 318/267; 307/116

[58] Field of Search .......... 318/16, 256, 264–267, 318/280, 283, 285, 466; 307/112, 113, 116, 117, 141; 200/DIG. 1

[56] References Cited

U.S. PATENT DOCUMENTS

| | | | |
|---|---|---|---|
| 3,551,770 | 12/1970 | Isaacs | 318/283 X |
| 3,666,988 | 5/1972 | Bellis | 307/116 X |
| 3,800,201 | 3/1974 | Gaul et al. | 318/283 |
| 3,993,940 | 11/1976 | Volk, Jr. | 318/267 X |
| 4,010,408 | 3/1977 | Bailey | 318/266 |
| 4,045,715 | 8/1977 | Umpleby et al. | 318/16 |

*Primary Examiner*—Robert S. Macon
*Assistant Examiner*—W. E. Duncanson, Jr.
*Attorney, Agent, or Firm*—Krass & Young

[57] ABSTRACT

A control system for a power driven operator for garage doors and the like comprising an operator control circuit having a DC voltage source operating as the power supply for an electronic flip-flop device responsive to successively applied input signals to alternatively establish circuits of opposite direction through a reversible electric motor; i.e. one actuation causes the motor to run in one direction and the next actuation causes it to run in the opposite direction. The operator is subject to actuation by both a hard wired push button or an auxiliary device such as a radio receiver which is responsive to signals from a remote transmitter. The operator control circuit includes a feature which electronically prevents the simultaneous energization of the reversible electric motor in both directions. A further feature is a provision for de-energizing the operator motor control circuit relays after a period during which no actuation occurs, or after an interruption of the line voltage, the interruption being caused by a thermal switch or by external means. Still another feature is a provision to energize external devices such as garage lights for a period following actuation of the motor control.

11 Claims, 1 Drawing Figure

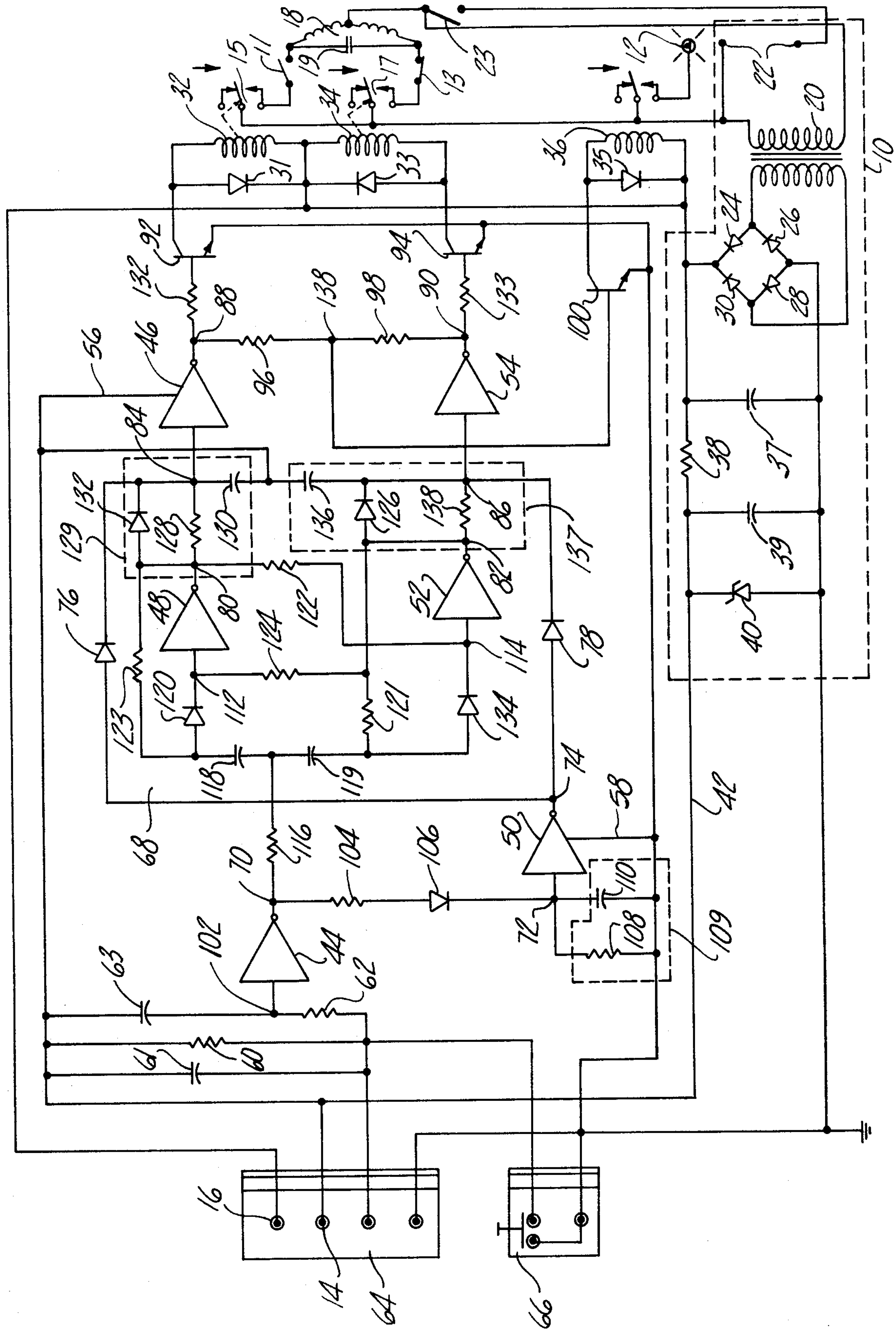

OPERATOR MOTOR CONTROL

BACKGROUND OF THE INVENTION

1. Field of the Invention

This invention relates to control circuits for motors incorporated into reversible power drive for closures such as garage doors and the like and more particularly to a control circuit which is adapted to be operated by push button and/or auxiliary device such as a remote radio receiver transmitter.

2. Prior Art

Radio operated power drive systems for garage doors, security gates and other movable members are in common use and typically comprise a reversible electric motor together with an input signal source such as push button or a radio transmitter-receiver combination for alternately starting the motor in opposite directions of travel. A stop command is typically provided by a device such as a limit switch which responds to the displacement of the movable member at the opposite limit of travel to open circuit the motor.

To insure that the motor is alternately driven in opposite directions for each successively applied input signal it has been common to use a mechanical relay device having a coil and a magnetically displaceable armature element which alternately toggles in a pivot arrangement to make opposite electric circuits to the drive motor. The relay, often termed a "ratchet relay," is a mechanically bi-stable device and has been in use in domestic and commercial garage door operators for many years. It is, however, relatively expensive and requires a momentarily large current surge for proper operation.

U.S. Pat. No. 4,045,715, assigned to the assignee of the present invention, discloses an improved operator for controlling the displacement of garage doors, gates and other similarly displaceable objects wherein the electric mechanically bi-stable relay device of the prior art is replaced with an all electronic bi-stable device commonly known as a solid state flip-flop. It also discloses two switches which are complementally operable by the bi-stable flip-flop to assume open and closed conditions between the line voltage source and the reversible electric motor which form the mode of power source of the operator. In addition the switches are electrically interconnected such that inadvertent closure of both switches effectively disconnects the motor from the power source and prevents improper operation thereof.

SUMMARY OF THE INVENTION

It is an object of the invention to improve upon the circuit of U.S. Pat. No. 4,045,715 which prevents the simultaneous energization of the opposite motor circuits. In general this is accomplished by providing a circuit arrangement which delays the energization of the first switch means for a period of time until the second switch means has been de-energized such that improper operation of the electric reversible motor is thereby precluded. A further feature of the invention is a provision for de-energizing the operator motor control circuit relays after a period during which no actuation occurs, or after an interruption of the line voltage, the interruption being caused by a thermal switch or by external means. The thermal switch disconnects the line voltage from the motor control circuit when the temperature of the reversible electric motor exceeds a predetermined value. This feature allows the use of less expensive relays since the relays are energized only temporarily while also providing a safety arrangement. Still another feature of the invention is a provision for a third circuit to energize external devices such as garage lights for a period following the actuation of the motor control.

BRIEF DESCRIPTION OF THE DRAWINGS

The single FIGURE is a detailed schematic diagram constituting a preferred embodiment of our invention.

DETAILED DESCRIPTION OF THE SPECIFIC EMBODIMENT

The drawing discloses a control circuit for controlling the operation of a reversible electric motor 18 in such a fashion as to alternately open and close a movable object such as an overhead garage door. The motor 18 is started by the operation of a push button 66 or by an external radio transmitter-receiver combination connected to terminal 64 and ground. The motor 18 is thereafter turned off at opposite limits of door travel by limit switches 11 and 13 representing the closed and open positions respectively. Power for the motor 18 is provided by terminals 22 through thermal switch 23 and one of switches 15 and 17 at any particular time.

When the push button 66 is operated the potential of the input of inverter 44 momentarily changes to the LOW state such that the output of inverter 44 changes to the HIGH state thereby causing the electronic flip-flop 68 to change states thereby reversing the states of relays 32 and 34. However, the change of the output states of the electronic flip-flop does not instantaneously change the state of the relay driver transistors 92 and 94. Delay decay circuits 129 and 137 operate to provide a slow change from the OFF state to the ON state in one relay over a few hundred milliseconds and also operate to provide a rapid change from the ON state to the OFF state in the other relay. Thus, relay 32 will not be energized until relay 34 has and sufficient time to open or vice versa.

A further feature of the illustrated circuit is an RC circuit 109 which, together with inverter 50 and diodes 76 and 78, overrides the state of the electric flip-flop 68, to cause both relays 32 and 34 to de-energize after a period of 2 to 5 minutes after the last actuation of push button switch 66, or after an interruption of the line voltage, the interruption being caused by a thermal switch 23 or by external means. Thermal switch 23 disconnects the line voltage from the motor control circuit when the temperature of the reversible electric motor 18 exceeds a predetermined value, thereby protecting the motor 18 from damage because of an overload condition. After the line voltage is interrupted, the motor control circuit must be manually reset by push button switch 66 or by an external radio transmitter-receiver combination connected to terminal 64 and ground. During the period when RC circuit 109 and inverter 50 are not in an overriding condition, relay driver transistor 100 senses whether the inverters 46 and 54 are in complementary states. When inverters 46 and 54 are in complementary states relay driver transistor 100 energizes relay 36 to thereby provide power to auxiliary devices such as garage light 12. The power supply 10 provides power to the relay driver transistors 92, 94 and 100, to the input of inverter 44.

Describing the circuit in more detail, the control circuit employs a power supply 10 consisting of a transformer 20 having one side of its primary connected to line voltage terminal 22 and the other side connected to the junction of thermal switch 23 and motor 18. The secondary of transformer 20 is connected to a full wave bridge rectifier consisting of diodes 24, 26, 28 and 30. The rectified output at the junction of diodes 24 and 30 is connected to one side of each of relays 32, 34 and 36 thereby providing power to both the relays and their associated driver transistors. The rectified output is also connected to terminal 16 to provide power to any auxiliary devices. The rectifier output is further connected to capacitor 37 through resistor 38, to capacitor 39 to provide a filtered voltage supply. The filtered voltage supply is then connected to Zener diode voltage regulator 40 in order to provide a regulated 12 volt DC supply through conductor 42. The regulated DC supply voltage is connected to the integrated circuit comprising inverters 44, 46, 48, 50, 52 and 54 through terminal 56 and ground terminal 58 of the integrated circuit. In addition by means of resistors 60 and 62 and capacitors 61 and 63, the regulated DC supply voltage is connected to the input of inverter 44 through conductor 42. The regulated DC supply voltage is also available for external devices through terminal 14.

Push button switch 66 is connected between ground and the junction of capacitor 61, terminal 64 and resistors 60 and 62. The other side of resistor 62 is connected to the junction of capacitor 63 and the input of inverter 44. The opposite sides of capacitors 61 and 63 and resistor 60 are connected to terminal 14 which in turn, is connected to conductor 42. The output of inverter 44 is connected to the junction of resistors 104 and 116. Diode 106 is connected between the other side of resistor 104 and the junction of resistor 108, capacitor 110 and the input of inverter 50. The output of inverter 50 is connected through diode 76 to the input of inverter 46, and through diode 78 to the input of inverter 54.

The other side of resistor 116 is connected to the junction of capacitors 118 and 119. One side of diode 120 is connected to the junction formed by the other side of capacitor 118 and resistor 123. The other side of diode 120 is connected to the junction of resistor 124 and the input of inverter 48. The opposite side of capacitor 119 is connected to the junction of resistor 121 and diode 134. The other side of diode 134 is connected to the junction of resistor 122 and the input of inverter 52.

The output of inverter 48 is connected to the junction of resistors 122, 123 and 128 and diode 132. The output of inverter 52 is connected to the junction of resistors 121, 124, 138 and diode 126.

The opposite side of resistor 128 is connected to the junction of diodes 76 and 132, capacitor 130 and the input of inverter 46. The opposite side of resistor 138 is connected to the junction of diodes 78 and 126 and capacitor 136 and the input of inverter 54. The junction of capacitors 130 and 136 is connected to conductor 42.

The output of inverter 46 is connected to the junction of resistors 96 and 132. The output of inverter 54 is connected to the junction of resistors 98 and 133. The junction of resistors 96 and 98 is connected to the base of transistor 100.

The bases of driver transistors 92 and 94 are connected to the other side of resistors 132 and 133 respectively. The collectors of driver transistors 92, 94 and 100 are connected to the one side of the parallel circuits consisting of diode 31 and relay coil 32, diode 33 and relay coil 34, and diode 35 and relay coil 36, respectively. The emitters of driver transistors 92, 94 and 100 are connected to ground.

The "closed" contact of switch 15 is connected through the down limit switch 11 to one side of capacitor 19 where the "closed" contact of switch 17 is connected through the up limit switch 13 to the opposite side of the capacitor. The armature of switch means 15 and 17 are connected to one side of the line voltage through one side of terminal 22. The common connection of the windings of motor 18 is connected to the other side of the line voltage through the thermal switch 23 to the other terminal 22.

OPERATION

In operation until an actuation signal is received from switch 66, the signal consisting of a momentary pulse of ground potential across push button 66, relays 32, 34 and 36 are normally open regardless of the state of the electronic flip-flop 68 as hereafter described. Having no actuation signal for at least 5 minutes, the circuit is at equilibrium and is thus described. The regulated DC supply across resistor 60 and 62 causes the input of inverter 44 to be in the HIGH state thereby causing the output at such inverter, point 70, to be in the LOW state. Since point 70 is in the LOW state, point 72 of inverter 50 is also in the LOW state thereby causing the output of inverter 50, point 74, to be in the HIGH state. With circuit point 74 of inverter 50 in the HIGH state either diode 76 or 78 conducts depending upon the state of the electronic flip-flop at the particular time. For example, assuming the first of two possible flip-flop states, let the output of inverter 48, point 80, be HIGH and the output of inverter 52, point 82, be LOW. Thus, diode 78 conducts and diode 76 does not conduct. The result is that points 84 and 86 of inverters 46 and 54 respectively are in the HIGH state thereby causing the output of both inverters 46 and 54 to be LOW. Thus, points 88 and 90 are in the LOW state thereby causing the first and second relay drivers, transistors 92 and 94 respectively, to be non-conductive thereby preventing the first and second relays, 32 and 34 respectively, from energizing. Further, since points 88 and 90 are both in the LOW state the voltage divider network consisting of resistors 96 and 98, at point 138 is also in the LOW state thereby preventing the third relay driver, transistor 100, from conducting and thus preventing the third relay 36 from energizing.

Considering the other possible state of the flip-flop at equilibrium, if the output of inverter 48, point 80, is LOW and the output at inverter 52, point 82, is HIGH, diode 78 does not conduct and diode 76 does conduct. The result is as before, that the input to both inverters 46 and 54, points 84 and 86 respectively is HIGH.

When an actuating signal is sent by push button switch 66, the input of inverter 44 is LOW for the duration of the actuating signal. Thus, the output at inverter 44, point 70, is in the HIGH state with the result that current flows through resistor 104 and diode 106 to the parallel combination of resistor 108, capacitor 110 and the input of inverter 50, point 72. The time constant of that circuit is on the order of 2 to 5 minutes such that as a positive pulse flows from point 70 of inverter 44 to point 72 of inverter 50, the parallel circuit is charged positively so that from 2 to 5 minutes, point 72 is in the HIGH state. Thus, the output of inverter 50, point 74, is in the LOW state with the result that diodes 76 and 78 are non-conductive so that the electronic flip-flop 68 controls the first and second relay drivers, transistors 92 and 94 respectively, for the period of the time constant resulting from resistor 108 and capacitor 110.

If the electronic flip-flop is initially in a state such that the input of inverter 48, point 112, is in the LOW state, and the input of inverter 52, point 114, is in the HIGH state, a positive pulse from point 70 of inverter 44 will conduct through resistor 116 through capacitor 118 and diode 120 into inverter 48 at point 112. The pulse is of sufficient potential such that point 112 is switched to the HIGH state with the result that the output of inverter 48, point 80, is switched LOW. With point 80 LOW, the input of inverter 52, point 114, is switched LOW through resistor 122 such that the output of inverter 52, point 82, is HIGH thereby creating a bi-stable state through resistor 124. The input of inverter 52, point 114, is switched LOW very rapidly such that diode 126 conducts and causes the input of inverter 54, point 86, to change to the HIGH state and thereby change the output of inverter 54, point 90, to the LOW state. The second relay driver, transistor 94 is then non-conductive and the second relay 34 opens. Simultaneously the output of inverter 48, point 80, changes from HIGH to LOW but in doing so does not decay instantaneously but decays over a few hundred milliseconds through the time constant circuit consisting of resistor 128 and capacitor 130.

The delay thereby prevents the first relay 32 from closing before the second relay 34 has had sufficient time to open. When the input of inverter 46, point 84, is LOW, the output of inverter 46, point 88, switches to the HIGH state and current conducts through resistor 132 to the first relay driver, transistor 92. Transistor 92 then conducts with the result that the first relay 32 closes, thus energizing the motor 18 in a first direction. When the electronic flip-flop 68 is in this state an actuating signal from push button 66 causes the electronic flip-flop 68 to reverse state in a similar manner except that capacitor 119, diode 134, and a time constant circuit consisting of capacitor 136 and resistor 138 are operative.

When the output of inverter 46, point 88, is HIGH and the output of inverter 54, point 90, is LOW or vice versa, the voltage device network consisting of resistors 96 and 98 provides a potential at point 138 equal to ½ of the sum between the HIGH state and the LOW state. This potential causes the third relay driver, transistor 100, to conduct such that the third relay 36 closes. Relay 36 is typically used to control a garage light, 12. Thus, the third relay driver transistor 100 conducts during the period of the time constant circuit comprised by resistor 108, capacitor 110, and inverter 50 at point 72. Approximately 3 minutes after the last actuating signal from push button switch 66, the time constant circuit of resistor 108 and capacitor 110 discharges sufficiently such that the input of inverter 50, point 72, changes to the LOW state thereby causing the output of inverter 50, point 74, to be in the HIGH state. Thus, the circuit returns to equilibrium such that the inputs of inverters 46 and 54, points 84 and 86 respectively, are in the HIGH state, and their output points, 88 and 90 respectively, are in the LOW state. Since points 88 and 90 are now in the LOW state, the potential of point 138 is also LOW thereby causing the third relay driver, transistor 100, to be non-conductive. Thus, the third relay 36 opens, de-energizing garage light 12. Also the first relay driver transistor 92, or the second relay driver, transistor 94, becomes non-conductive thereby causing the first relay 32 or or the second relay 34 to open, the other relay already being open due to the operation of the electronic flip-flop 68.

In the event of a line voltage interruption by either the thermal switch 23 or by external means, relays 32, 34 and 36 will open if not already open. Assuming that push button switch 66 has been actuated and that relay 32 is closed and relay 34 is open or vice versa, an interruption of the line voltage will cause the rapid drop of potential at terminal 56 of the CMOS integrated circuit comprising inverters 44, 46, 48, 50, 52 and 54.

When the potential at terminal 56 drops, the protective diode circuitry of each inverter conducts in a forward direction thereby discharging the input of each inverter. Said protective diode circuitry is standard in CMOS integrated circuits and is well known in the art.

Accordingly, the RC circuit 109, consisting of resistor 108 and capacitor 110 is rapidly discharged, thereby causing the input of inverter 50, point 72, to be in the LOW state. The RC circuit 109 will remain discharged even after the potential at terminal 56 returns to its normal value. As previously described when the input of inverter 50 is in the LOW state, relays 32, 34 and 36 are open. Therefore, after a line voltage interruption by either the thermal switch 23 or by external means, the motor control circuit must be manually reset by push button 66 or by an external radio transmitter-receiver combination connected to terminal 64 and ground. This feature assures that after a line voltage interruption, the motor 18 will not automatically resume operation upon the return of the line voltage.

The following component values have been found satisfactory for an operative embodiment of the invention:

| | COMPONENTS | |
|---|---|---|
| Reference Number | Type | Value |
| 37 | capacitor | 100 mfd, 50 WVDC |
| 38 | resistor | 220 ohms 1 watt |
| 39 | capacitor | 100 mfd, 16 WVDC |
| 40 | Zener diode | 13 volts 5%, 1 watt |
| 44,46,48,50,52 and 54 | CMOS integrated circuit | type CD 4069 |
| 60 | resistor | 100 K ohms |
| 61 | capacitor | 1 mfd |
| 62 | resistor | 220 K ohms |
| 63 | capacitor | .02 mfd |
| 96 | resistor | 10 K ohms |
| 98 | resistor | 10 K ohms |
| 104 | resistor | 10 K ohms |
| 108 | resistor | 15 M ohms |
| 110 | capacitor | 22 mfd, 25 WVDC |
| 116 | resistor | 1 K ohms |
| 118 | capacitor | 0.068 mfd |
| 121 | resistor | 180 K ohms |
| 122 | resistor | 47 K ohms |
| 123 | resistor | 180 K ohms |
| 124 | resistor | 47 K ohms |
| 128 | resistor | 22 M ohms |
| 130 | capacitor | .02 mfd |
| 132 | resistor | 10 K ohms |
| 133 | resistor | 10 K ohms |
| 136 | capacitor | .02 mfd |
| 138 | resistor | 22 M ohms |

The invention has been described with reference to a specific embodiment and specific component values and it is to be understood that although this embodiment represents the best mode in practicing the invention known to the inventor at the time of filing the patent application, variuos modifications and additions to the illustrated embodiment are possible and accordingly the foregoing description is not to be construed in a limiting sense.

The embodiments of the invention in which an exclusive property or privilege is claimed are defined as follows:

1. In a bi-directional motor control circuit of the type having a power supply, first and second power switches for alternately completing circuits of opposite sense between the power supply and the motor for direction control, an electronic flip-flop responsive to successively applied signals to reverse its state of conductivity and the improvement comprising:

first and second delay means connected between respective stages of the flip-flop and said first and second power switches to delay closing actuation of each switch for a sufficient period to insure opening of the other power switch prior to closing of the actuated switch.

2. Apparatus as defined in claim 1 wherein means connecting the first and second power switch means with first and second delay means comprises first and second relay coils connected to be energized alternately as first and second relay drivers are energized, the coils being in operative association with the power switch means to complementally control the conditions thereof.

3. Apparatus as defined in claim 2 further comprising first and second relay drivers connected in series circuit with the first and second relay coils respectively and having their control electrodes connected for control by the output stages of the electronic flip-flop.

4. Apparatus as defined in claim 1 wherein said motor includes a pair of windings and a common terminal connecting the windings, first and second power switches each including an armature and adjacent closed contact means, means connecting the closed contact means of the switches to the respective windings of the motor, means connecting the armature means of each switch commonly to one side of the power supply and means connecting the common terminal to the other side of said power supply.

5. Apparatus as defined in claim 4 wherein the means connecting the common terminal of the motor to the other side of the power supply includes a thermally controlled switch.

6. A bi-directional motor control circuit of the type having a power supply, first and second power switches for alternatively completing circuits of opposite sense between the power supply and the motor for direction control, and an electronic flip-flop responsive to successively applied signals to reverse its state of conductivity, and the improvement comprising:

circuit means connected to the input of the electronic flip-flop, the power supply, and the first and second power switch means, operative to open one of said first or second power switch means as a function of the condition of the input to said flip-flop and the power supply.

7. Apparatus as defined in claim 6 wherein the circuit means connected to the input of the electronic flip-flop and the first and second power switch means further comprises unidirectional means to isolate the first power switch means from the second power switch means.

8. Apparatus as defined in claim 6 wherein the circuit means comprises a complementary metal oxide semiconductor inverter controlled by a resistor-capacitor timing circuit.

9. A bi-directional motor control circuit of the type having a power supply, first and second power switches for alternately completing circuits of opposite sense between the power supply and a motor for direction control, and an electronic flip-flop responsive to successively applied signals to reverse its state of conductivity, and the improvement comprising:

third power switch means, and sensing means connected between the first power switch means and the second power switch means operative to sense the existence of complemental states in said first and second switch means and to control the energization of said third power switch means as a function of the existence or non-existence of said complemental states.

10. Apparatus as defined in claim 9 wherein means connecting the third power switch means and the sensing means comprises a third relay coil connected to be energized as a third relay driver is energized, the coil being in operative association with the power switch means to control the condition thereof.

11. Apparatus as defined in claim 10 further comprising the third relay driver connected in series circuit with the third relay coil and having its control electrode connected for control by the first and second power switches.

* * * * *